United States Patent
Kieliszek et al.

(10) Patent No.: US 11,095,521 B2
(45) Date of Patent: Aug. 17, 2021

(54) METHOD AND SYSTEM FOR IDENTIFYING A COMMUNICATION PORT OF A TELECOMMUNICATION NETWORK

(71) Applicant: NBN Co Limited, North Sydney (AU)

(72) Inventors: Martin Kieliszek, North Sydney (AU); Dean Bailey, North Sydney (AU)

(73) Assignee: NBN Co Limited, North Sydney (AU)

( * ) Notice: Subject to any disclaimer, the term of this patent is extended or adjusted under 35 U.S.C. 154(b) by 25 days.

(21) Appl. No.: 16/532,231

(22) Filed: Aug. 5, 2019

(65) Prior Publication Data

US 2020/0052972 A1    Feb. 13, 2020

(51) Int. Cl.
H04B 1/66 (2006.01)
H04L 12/24 (2006.01)
H04L 12/28 (2006.01)

(52) U.S. Cl.
CPC .......... *H04L 41/12* (2013.01); *H04L 12/2885* (2013.01); *H04L 12/2898* (2013.01); *H04L 41/22* (2013.01)

(58) Field of Classification Search
CPC ..... H04L 12/26; H04L 12/2697; H04L 43/06; H04L 43/50; H04B 17/24; H04B 2210/08
USPC ........................................ 370/241, 242, 248
See application file for complete search history.

(56) References Cited

U.S. PATENT DOCUMENTS

| | | | | |
|---|---|---|---|---|
| 3,891,811 A * | 6/1975 | Miller | .................... | G01R 31/60 324/66 |
| 4,837,488 A * | 6/1989 | Donahue | ................. | G01R 31/60 324/66 |
| 5,744,967 A * | 4/1998 | Sorensen | ............... | G01R 31/50 324/540 |
| 6,777,952 B2 * | 8/2004 | Seymour | ................ | G01R 31/58 324/525 |
| 7,023,804 B1 * | 4/2006 | Younes | ............... | H04L 12/5601 370/236 |
| 8,289,873 B2 * | 10/2012 | Stamler | ................ | G06Q 10/087 370/252 |
| 9,727,501 B2 * | 8/2017 | Gowravaram | .......... | G06F 13/28 |
| 9,768,990 B2 * | 9/2017 | Kreuzer | ............. | G05B 23/0256 |
| 10,051,117 B2 * | 8/2018 | Zahedi | ................ | H04L 41/0677 |
| 2010/0238428 A1 * | 9/2010 | Glines | .................. | G01M 11/332 356/73.1 |
| 2015/0288589 A1 * | 10/2015 | Radford | ........... | H04N 21/44209 370/252 |
| 2017/0220972 A1 * | 8/2017 | Conway | .................. | G01D 21/00 |
| 2018/0262891 A1 * | 9/2018 | Wu | ......................... | H04W 4/00 |
| 2020/0052972 A1 * | 2/2020 | Kieliszek | ................ | H04L 41/24 |

* cited by examiner

*Primary Examiner* — Dmitry Levitan
(74) *Attorney, Agent, or Firm* — Polsinelli PC (57) ABSTRACT

The present disclosure is directed to a method and a system for identifying a communication port in a telecommunication network. The technology allows a field network operator to connect a network termination device (NTD) to a network access node (NAN) of the telecommunication network and automatically receive, on a mobile communication device, information related to physical and logical location of the communication port where the NTD is connected.

24 Claims, 7 Drawing Sheets

| General | QoS | Details 1 | Details 2 | NTP | ... | Map Info |

▼ Identification

| | | |
|---|---|---|
| ONT ID | ✕ | ————G-240G-P___ |
| Family Type | ✕ | GSFU |
| Equipped Type | ✕ | G-240G-P |
| Serial Number | ✕ | ALCLF84287BF |
| YP Serial Number | ✕ | |
| Version Number | ✕ | 3FE56159AAAA01 |
| Provisioned Version | ✕ | |

METHOD AND SYSTEM FOR IDENTIFYING A COMMUNICATION PORT OF A TELECOMMUNICATION NETWORK

RELATED APPLICATION

This application claims priority from Australian Patent Application No 2018214022 entitled 'Method and system to identify a data port in a telecommunication network' filed on 7 Aug. 2018. The entire disclosure of AU 2018214022 is hereby incorporated by reference herein.

TECHNICAL FIELD

The present technology relates to a method and a system to identify a connection port in a telecommunication network. In particular, the present technology is suitable to identify the physical and logical details of a specific data port in a complex telecommunication network.

BACKGROUND

The amount of data moving across data networks all over the globe is ever-growing and so is the requirement for network bandwidth. Large bandwidth telecommunications networks are being deployed worldwide to provide users with systematic access to large fast data connections. Many of the new networks being deployed are based on optical fibres (optical networks).

During deployment, or 'roll-out', and maintenance of optical networks, for example, field operators generally work with many different network optical data ports linked to optical line terminators (OLT). It is important for operators to be able to identify an optical port quickly. In particular, operators need to know the physical and logical address of a specific data port in order to connect a new user to the network or perform maintenance of the port, the OLT or the connection in between the two.

In passive optical networks (PONs), for example, the procedure followed by field operators to identify a specific port is not automated, can be lengthy and convoluted, leading to detrimental inefficiencies during the roll-out and maintenance process.

Currently, in order to identify an optical data port, operators connect a network termination device (NTD) to a fibre tail leading an OLT, if the user is allowed access, they log into the Network Management System (NMS) using a laptop and VPN service, navigate to the OLT that the operator expects the NTD to be connected to on a graphical-user interface (GUI), before finally attempting to validate that the NTD serial number is displayed on the expected port, alternatively they can search the unique ID of the NTD. This process can be extremely time consuming, in particular, when the operator has to identify multiple data ports or have mistakenly connected the NTD along the wrong connectivity path.

Another method to identify a data port is for the field operator to contact, by phone or e-mail, the network management team to turn one or more ports on and off and use a detection device to identify a relevant port. Alternatively, the operator can connect a light source to a port at one side of the fibre and a second operator can try to identify the specific fibre at the exchange side. Both these methodologies require interruption to all services on the fibre while the testing is performed, in addition to being very inefficient.

The problems described above with reference to optical networks are also common to other fixed access-type networks, such as DSL and HFC networks.

SUMMARY

In accordance with a first aspect, the present invention provides a method for identifying a telecommunication network data port; the method comprising:
using a network termination device (NTD) connected to an access node (AN) of the telecommunication network to send a signal comprising a NTD unique identifier through the telecommunication network;
using a network management system (NMS) to receive the signal and provide a data matching module with access to the signal;
the data matching module receives the signal and matches the unique identifier with a human network operator associated to the NTD; and
when a match is found, a messaging module sends a message to the human operator, the message including identification information of the data port.

The telecommunication network may be an optical telecommunication network and the data port may be an optical data port. In this instance the NTD may be an optical network terminal (ONT) and the AN may be an optical line terminator (OLT). Alternatively, the telecommunication network may be a VDSL network. In this instance the NTD may be a VDSL modem and the AN may be a DSLAM. The method may be applied to a number of other network types.

In embodiments, the unique identifier comprises a serial number of the NTD or a MAC address of the NTD.

In embodiments, the step of sending a message to the human operator comprises the step of sending an SMS or a notification to a mobile communication device of the human operator.

In embodiments, the identification information of the data port include one or a combination of: the physical location of the data port, the logical location of the data port, the location of the access node or the location of a related chassis card. The identification information may also comprise information related to the communication path between the NTD and the AN.

In embodiments, the step of sending a signal comprising a unique identifier comprises sending a predetermined NTD event code through the optical telecommunication network. The event code may also be an alarm code provided in a library of alarm codes of the NTD or NMS.

In an embodiment, a listener module may be configured to interpret the predetermined NTD or NMS event code as a request for identification of a data port, the method further comprising the step of receiving the predetermined NTD event code.

In an embodiment, the step of matching the unique identifier with a human network operator associated to the NTD comprises the step of accessing a database comprising details of a plurality of registered human network operators and associations between each human network operator and a NTD.

In accordance with a second aspect, the present invention provides a system for identifying a telecommunication network data port; the system comprising:
a network termination device (NTD) arranged to connect to an access node (AN) of the telecommunication network and send a signal comprising a NTD unique identifier through the optical telecommunication network;

a network management system (NMS) arranged to receive the signal and provide a network matching module with access to the signal;

a network matching module arranged to receive the signal and match the unique identifier with a human network operator associated to the NTD; and a messaging module arranged to forward a message to the human operator, the message including identification information of the data port;

wherein, in use, the human operator connects the NTD to the AN and automatically receives a message including the identification information NTD.

In embodiments of the second aspect, the telecommunication network may be an optical telecommunication network and the data port may be an optical data port. In this instance the NTD may be an optical network terminal (ONT) and the AN may be an optical line terminator (OLT). Alternatively, the telecommunication network may be a VDSL network. In this instance the NTD may be a VDSL modem and the AN may be a DSLAM. The method may be applied to a number of other network types.

In embodiments of the second aspect, the unique identifier comprises a serial number of the NTD or a MAC address of the NTD.

In embodiments of the second aspect, the message sent to the human operator comprises an SMS or a notification to a mobile communication device of the human operator.

In embodiments of the second aspect, the identification information of the data port include one or a combination of: the physical location of the data port, the logical location of the data port, the location of the access node or the location of a related chassis card. The identification information may also comprise information related to the communication path between the NTD and the AN.

In an embodiment of the second aspect, the NTD is further arranged to send a signal comprising a predetermined NTD event code through the optical telecommunication network. The event code may also be an alarm code provided in a library of alarm codes of the NTD or NMS.

In an embodiment of the second aspect, the system further comprises an event listener module receiving event data from the NMS and configured to interpret the predetermined NTD event code as a request for identification of a data port.

In an embodiment of the second aspect, the system further comprises a database comprising details of a plurality of registered human network operators and associations between each human network operator and a NTD.

The matching module, upon detecting a predetermined event code through the listener module, the matching module may interrogate the database and match the NTD unique identifier with a human operator identifier. The human operator contact details, such as operator phone number or e-mail address can be retrieved and passed on to the messaging module.

Advantageous embodiments of either aspect of the invention enable network operators and field technicians to identify the physical and logical location of a data port in a communication network efficiently by simply connecting the NTD to the communication port. The port identification data is received by the network operator or field technician on a mobile communication device. In some instances the data may comprise more than just the location of the data port. For example the data may provide information on the actual communication path from the data port to the AN.

The technology described herein provides several advantages such as: empowering field engineers with a simple automated tool at a low cost; reducing calls into network management centres; sending real time network data to field staff; save network deployment cost, simple to deploy and simple to use; facilitate data verification.

In addition, the technology allows removing the requirement for field technicians or external contractors to obtain access to internal telecommunication network systems for troubleshooting. Instead, only requires once off "registration" to pair a field technician's NTD identifier with their contact details.

Further, the technology allows avoiding troubleshooting steps that technicians must take to identify their connectivity. Instead, the information that would otherwise manually have to be searched for and verified is provided both autonomously and precisely by the system, saving time, complexity and ultimately, cost.

Furthermore, the technology can be used not only during deployment stages of a telecommunication network, but for the assurance of the network after it has been deployed.

Throughout this specification, unless the context clearly requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps.

Throughout this specification, the term 'consisting of' means consisting only of.

Any discussion of documents, acts, materials, devices, articles or the like which has been included in the present specification is solely for the purpose of providing a context for the present technology. It is not to be taken as an admission that any or all of these matters form part of the prior art base or were common general knowledge in the field relevant to the present technology as it existed before the priority date of each claim of this specification.

Unless the context requires otherwise or specifically stated to the contrary, integers, steps, or elements of the technology recited herein as singular integers, steps or elements clearly encompass both singular and plural forms of the recited integers, steps or elements.

In the context of the present specification the terms 'a' and 'an' are used to refer to one or more than one (ie, at least one) of the grammatical object of the article. By way of example, reference to 'an element' means one element, or more than one element.

In the context of the present specification the term 'about' means that reference to a figure or value is not to be taken as an absolute figure or value, but includes margins of variation above or below the figure or value in line with what a skilled person would understand according to the art, including within typical margins of error or instrument limitation. In other words, use of the term 'about' is understood to refer to a range or approximation that a person or skilled in the art would consider to be equivalent to a recited value in the context of achieving the same function or result.

Those skilled in the art will appreciate that the technology described herein is susceptible to variations and modifications other than those specifically described. It is to be understood that the technology includes all such variations and modifications. For the avoidance of doubt, the technology also includes all of the steps, features, and compounds referred to or indicated in this specification, individually or collectively, and any and all combinations of any two or more of said steps, features and compounds.

In order that the present technology may be more clearly understood, preferred embodiments will be described with reference to the following drawings and examples.

BRIEF DESCRIPTION OF THE DRAWINGS

Notwithstanding any other forms which may fall within the scope of the present invention, to make the technology more clearly understood, an embodiment of the technology will now be described, by way of example only, with reference to the accompanying drawings in which.

DETAILED DESCRIPTION OF EMBODIMENTS

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

It is to be understood that the terminology employed herein is used for the purpose of describing particular embodiments only and is not intended to be limiting since the scope of the disclosure will be limited only by the claims and equivalents thereof.

In describing and claiming the subject matter of the disclosure, the following terminology will be used in accordance with the definitions set out below.

It should be noted in the following description that like or the same reference numerals in different embodiments denote the same or similar features.

The present disclosure relates to a method and a system for efficiently identifying a telecommunication network data port. The method and the system enable network operators and field technicians that need to operate on a specific data port, for example to connect a new user or to perform maintenance, to identify the physical and logical location of the port by connecting a network termination device (NTD) to the communication port. The port identification data is received by the network operator or field technician on a mobile communication device. In some instances the data may comprise more than just the location of the data port. For example the data may provide information about the actual communication path from the data port to the access node (AN).

Figure 1:
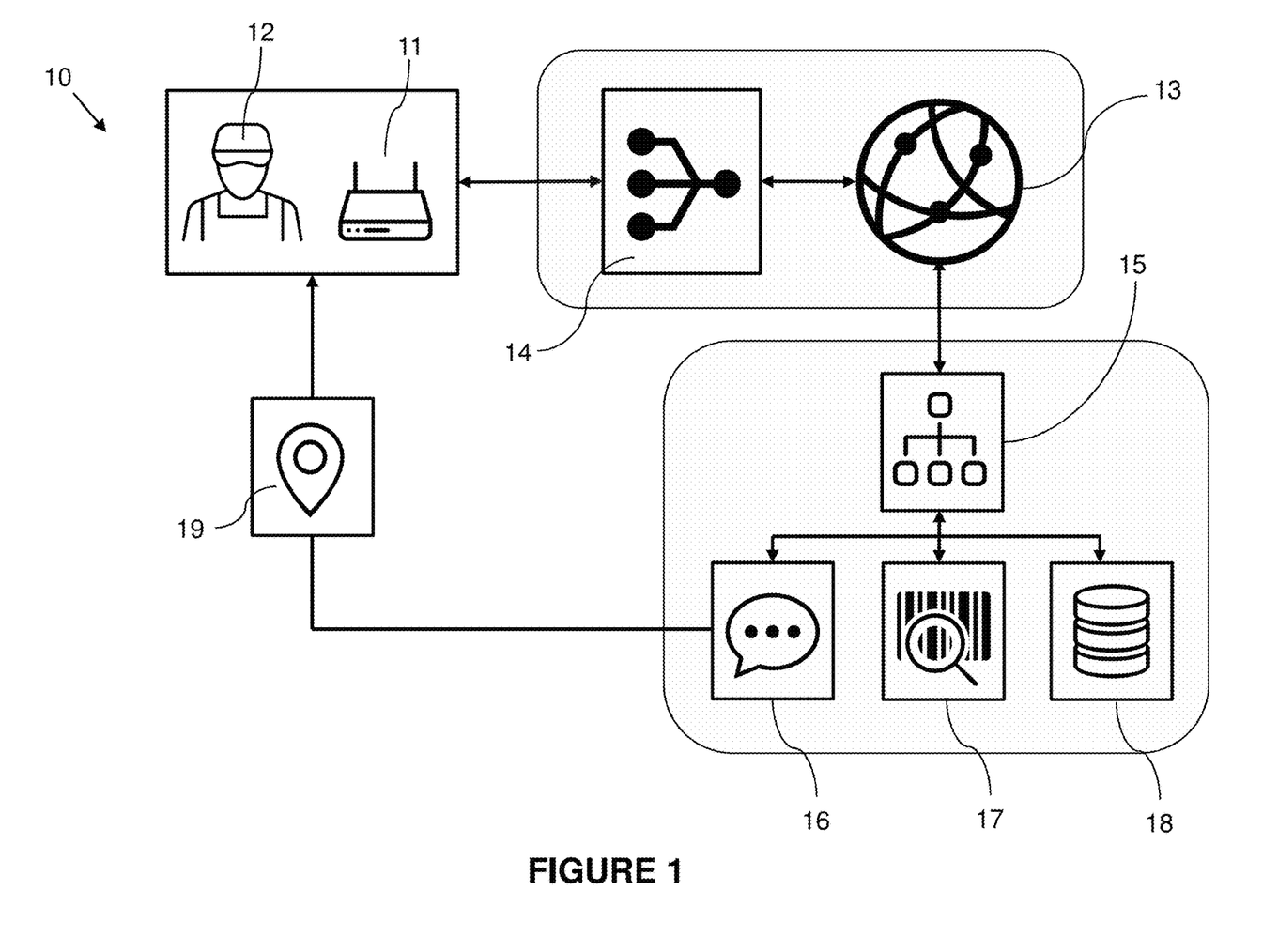
FIG. 1 shows a schematic representation of a system for identifying a communication data port in a telecommunication network.

Referring now to FIG. 1, there is shown a schematic representation of a system 10 for identifying a communication data port in a telecommunication network. The system comprises a NTD 11, for example a modem with a unique identifier, such as the NTD 11 serial number or MAC address, associated with a human operator 12. The NTD 11 can be plugged into the network 13 by an operator 12 in order to identify a network data port. Once plugged-in, the NTD 11 connects to a network AN 14 via a physical connection. The connection of the NTD 11 to the AN 14 generates a new event signal that can be detected by a network management system (NMS) 15 that monitors and manages network activities.

The system 10 comprises a matching module, arranged to receive event signals and match the unique identifier of the NTD 11 with the human network operator 12. The matching module may be located in a data network centre. The matching module includes: an event listener module 17 that receives event data from the NMS 15 and scans the event data for connection events.

The system 10 also comprises a database 18 with details of registered human network operators and associations between each human network operator and a specific NTD. If an association between the NTD 11 that has generated an event and a human operator 12 is registered in the database, the identification information of the relevant data port where the NTD 11 is connected are passed on to a messaging module 16. The messaging module 16 is arranged to send a message 19 including identification information of the data port to the human operator 12. In the embodiment described herein, the messaging module 16 is an SMS messaging module arranged to send a text message to the human operator's 12 mobile phone. The identification information of the data port includes the physical location of the data port, the logical location of the data port, the location of the access node and/or the location of a related chassis card. The identification information may also comprise information related to the communication path between the NTD and the AN.

Figure 2:
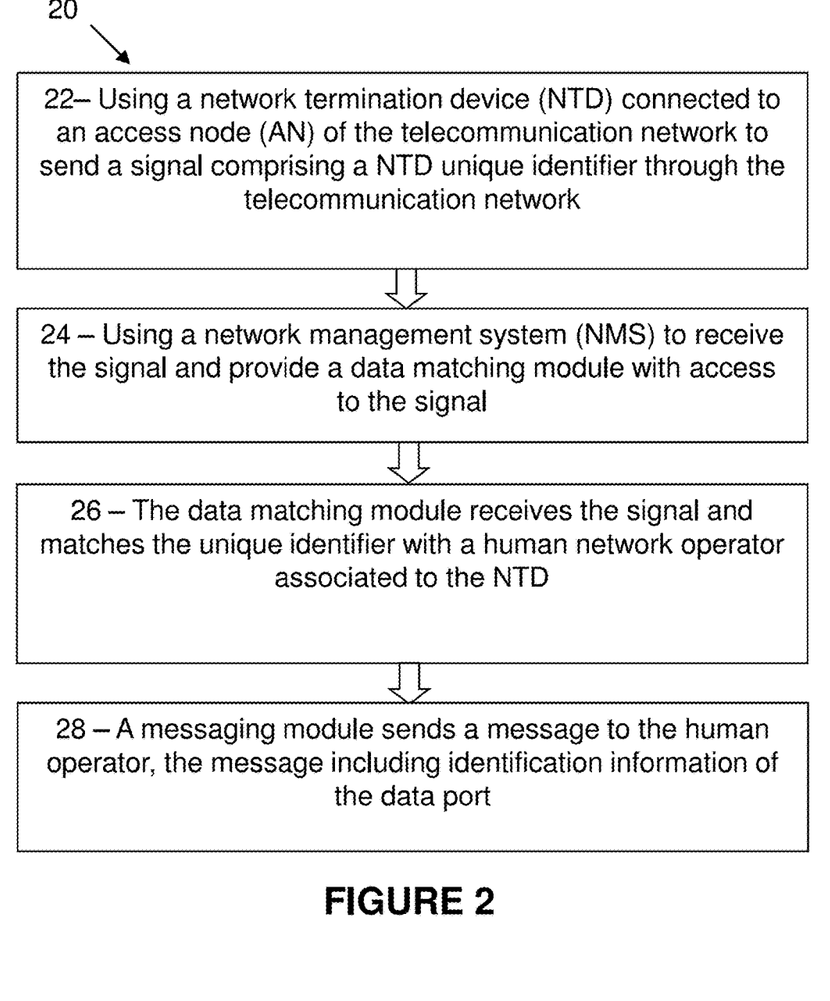
FIG. 2 is flow diagram outlining steps used to perform a method for identifying a telecommunication network data port.

Referring now to FIG. 2 there is shown a flow diagram 20 outlining steps used to perform a method for identifying a telecommunication network data port in accordance with embodiments. At step 22, a network termination device (NTD) connected to an access node (AN) of the telecommunication network sends a signal comprising a NTD unique identifier, such as a NTD serial number or a MAC address, through the optical telecommunication network. At step 24, a network management system (NMS) receives the signal and provides access to the signal to a data matching module. At step 26, the matching module receives the signal and matches the unique identifier with a human network operator associated to the NTD. When a match is found, a messaging module sends a message, such as an SMS, a notification or an e-mail, to the human operator, the message includes identification information of the data port, for example, the physical location of the data port, the logical location of the data port, the location of the access node or the location of a related chassis card. The identification information may also comprise information related to the communication path between the NTD and the AN.

The predetermined NTD event code is received by a listener module configured to interpret the predetermined NTD or NMS event code as a request for identification of a data port. A database comprising details of a plurality of registered human network operators and associations between each human network operator and a NTD is accessed in order to perform the matching.

Gigabit Passive Optical Network (GPON)

The technology described herein can be used to identify an optical data port in a GPON. This application is described in the section below with reference to FIGS. 3 to 7.

Figure 3:
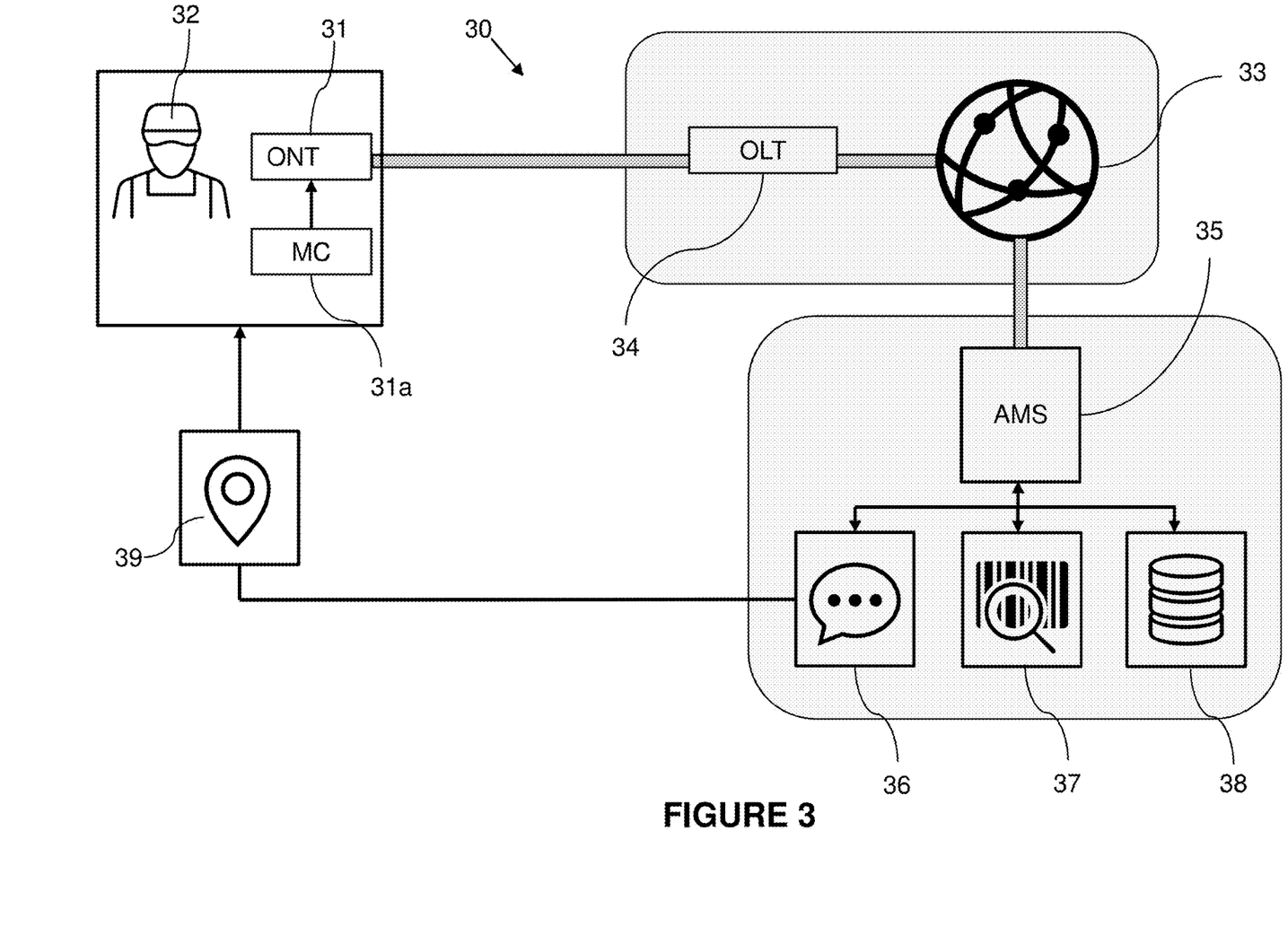
FIG. 3 shows a schematic representation of a system for identifying an optical data port in an optical telecommunication network.

FIG. 3 shows a schematic representation of a system 30 for performing identification of an optical data port.

The system 30 of FIG. 3 replicates the structure of the system 10 of FIG. 1 while using components suitable for optical networks. An optical network terminal (ONT) 31 is used as an NTD, such as a Nokia GPON ONT SFP (G-010S-P). In order to connect the ONT 31 to the network a Fibre Gigabit Ethernet media convertor 31a, such as Winya USB1000F Fibre Gigabit Ethernet, can be used. The media converter can be powered by USB, for example using a USB power bank. The media converter is used in this instance to both power the GPON SFP and to allow the optical signal to be terminated by the GPON SFP.

The ONT 31 is connected via a passive fibre network path to an optical line terminator (OLT) 34, such as an Alcatel-Lucent 7302 Intelligent Services Access Manager (ISAM). When the ONT is connected to the OLT and powered, the ONT raises an alarm code on the NMS. The Alarm code is initially recognised by a network Access Management System (AMS) 35, for example Nokia AMS Access Provisioning Center 5529. The AMS consists of a plurality of modules that enable fulfilment services, inventory services, assurance services and provisioning services for GPON and DSL access technologies.

Figure 4:
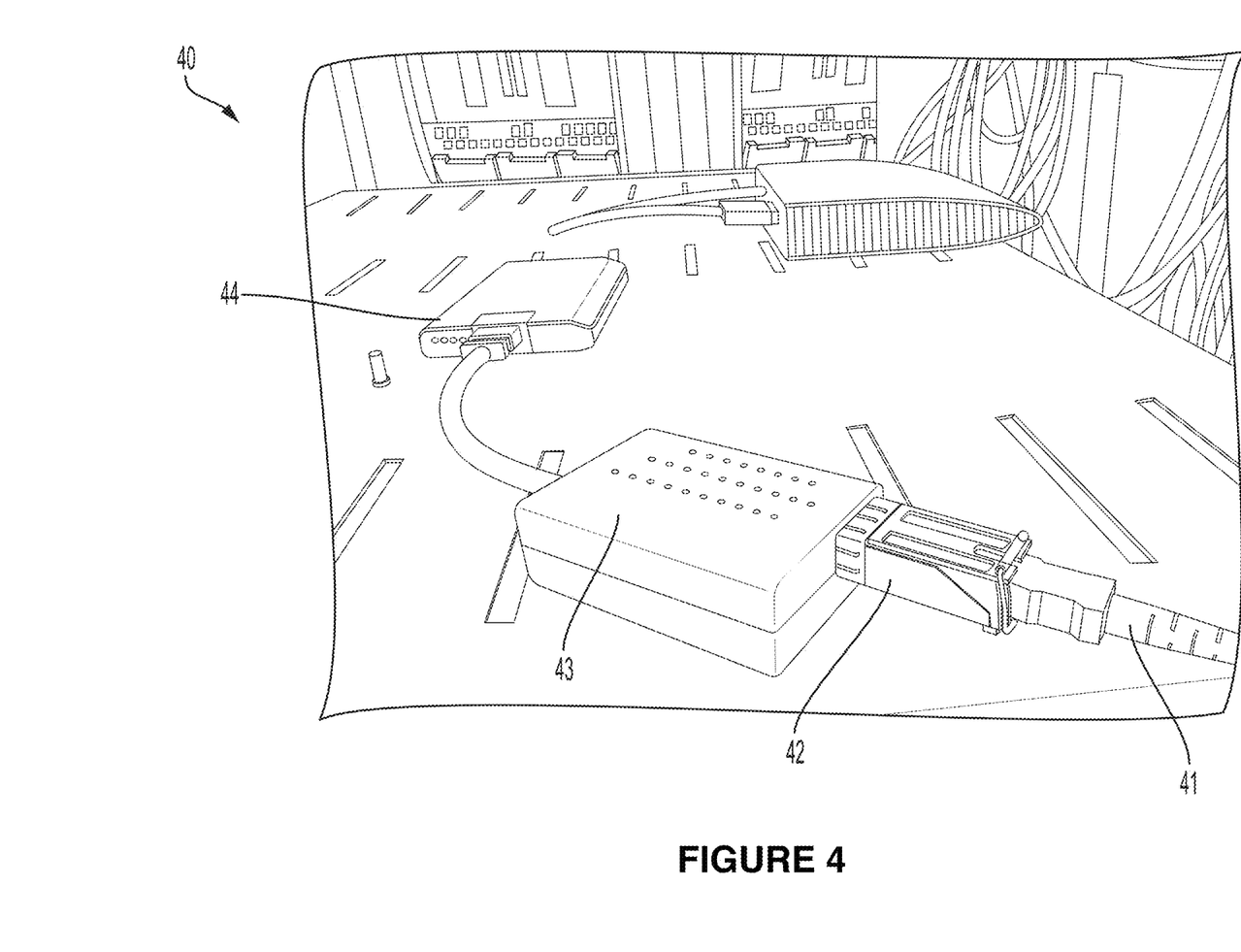
FIG. 4 shows a green fibre inserted into a black Fibre Gigabit Ethernet media convertor via a metallic small form-factor pluggable transceiver (SFP) that acts as the NTD for the human operator. The media convertor is powered by a white 5V battery.

FIG. 4 shows an image 40 of a green fibre lead 41 inserted into a metallic small form-factor pluggable transceiver (SFP) 42 plugged into a black Fibre Gigabit Ethernet media convertor 43 to form the NTD. The media convertor 43 is powered by a white 5V battery 44 to power the setup in 40.

Figure 5:
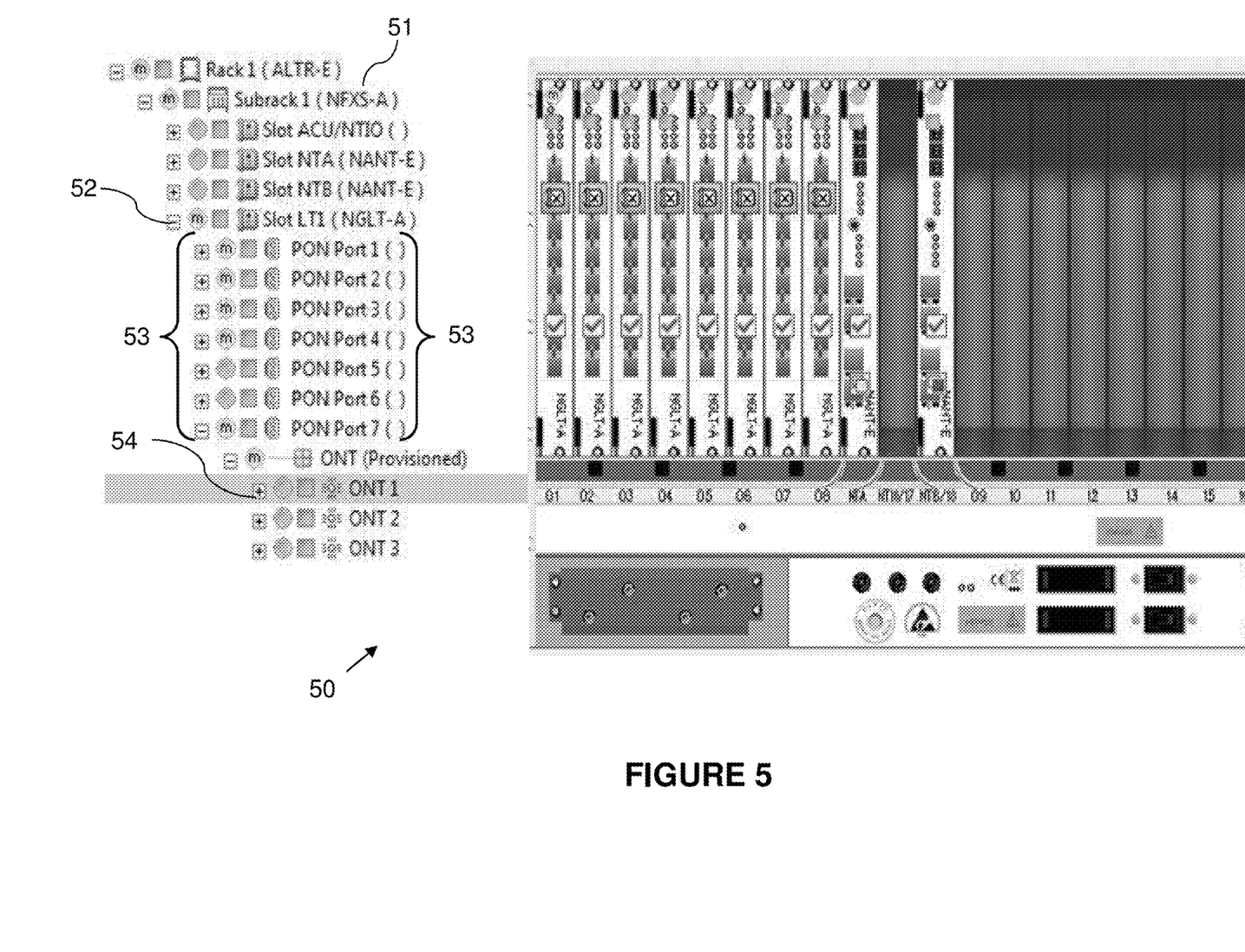
FIG. 5 shows an example GUI of a Network Management System that a field technician would traverse through in order to observe the status of their NTD connection on an OLT port.

FIG. 5 shows an example of AMS graphical user interface 50 dashboard for system 30. The OLT sub rack 51 consists of a number of slots. The relevant slot for the system are the line terminal slots (LT) 52. The LT slots have 8 or 16 PON ports 53 and the PON ports have a limit set to 128 ONT's.

When a field technician or network operator inserts the fibre 41 into the NTD (42, 43 and 44); a "new" ONT is recognised on AMS 35 on the specific OLT 34, LT card and PON port that was physically used. When the ONT 31 is recognised by the network a serial number is recorded. The ONT 31 is tied to an OLT 34 logical name, LT 52 card number and PON port number 53.

Figure 6:
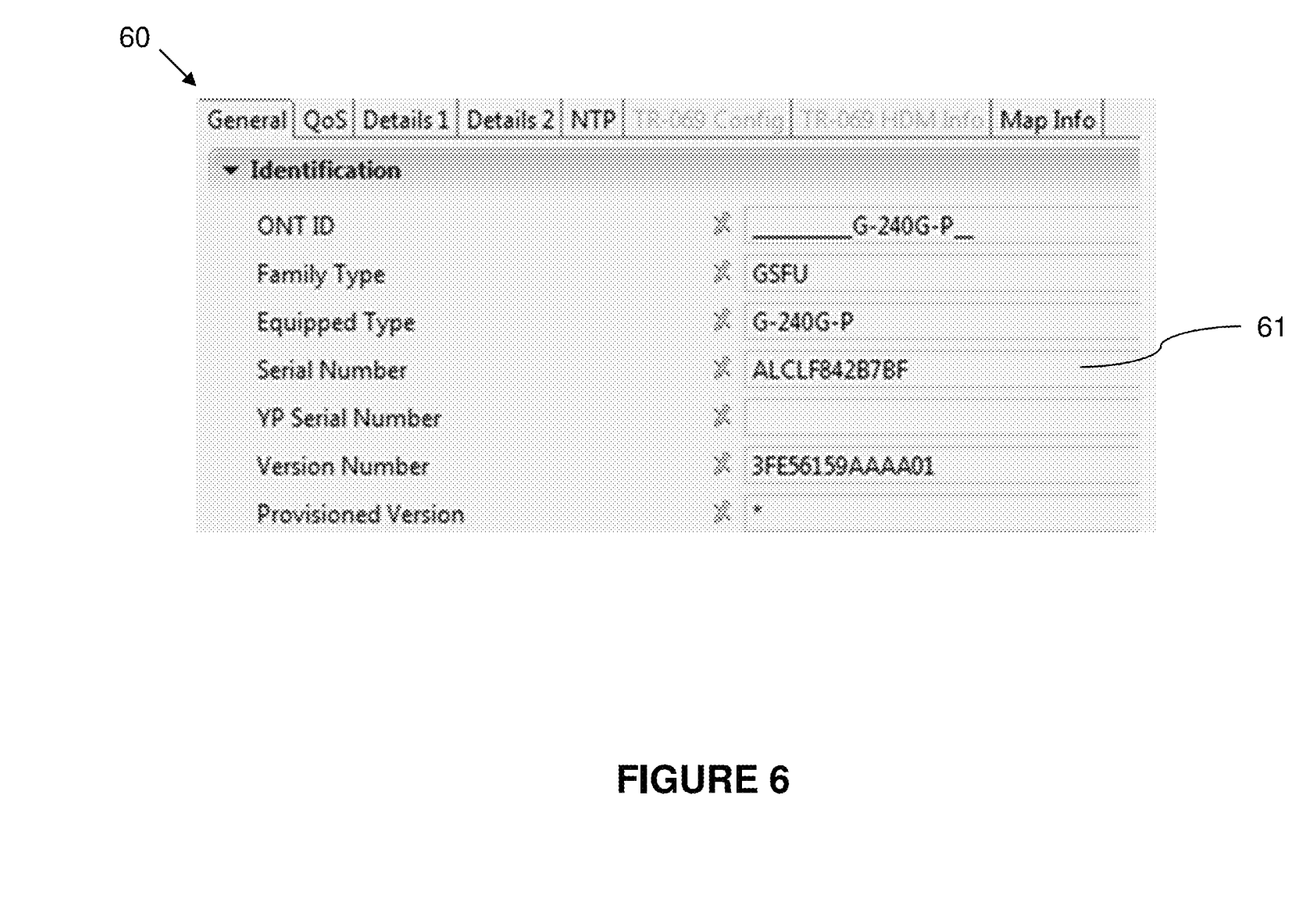
FIG. 6 shows an example of NTD being identified on the NMS GUI, including details of its serial number.

FIG. 6 provides an example of the AMS details of an ONT connected to the PON port on an OLT via an optical network path. This data is shown when selecting a specific ONT in AMS GUI 54. The serial number tied to the NTD can be seen and verified in 61

Listener module 37 subscribes to the AMS 35 and its APC module. When an alarm code is detected by the listener 37, the unique identifier, for example the G-010S-P serial number is used by the matching logic service to query a table in a database module 38. Database module 38 may be an Oracle-based database or any other suitable database that allows building a register of unique serial number to human network operator mapping. If a match in the database is found, the serial number of the ONT and one or a combination of: port details, slot details, OLT rack details are sent to the operator mobile communication device.

The listener module 37 comprises a Java Messaging Service that can detect the alarm details by subscribing to AMS 35 and its APC module as mentioned above. In this instance, a "subscription topic" for "newOntAlarm's" is configured on AMS APC. The listener service is a "Java Spring" application that runs within a Docker container on a virtual machine. The Java application subscribes to an XML feed of data, specifically "listening" for "newOntAlarms" as configured above within AMS 35 APC. AMS 35 recognizes the listener application as a "client". Hence, when AMS 35 receives any new ONT alarms from Access Nodes, it forwards alarm detail in XML format towards all clients listening on that subscription topic—which includes the listener 37. In between alarm notifications, AMS 35 sends a heartbeat message towards all clients to verify whether the client is still active and capable of receiving future notifications.

Figure 7:
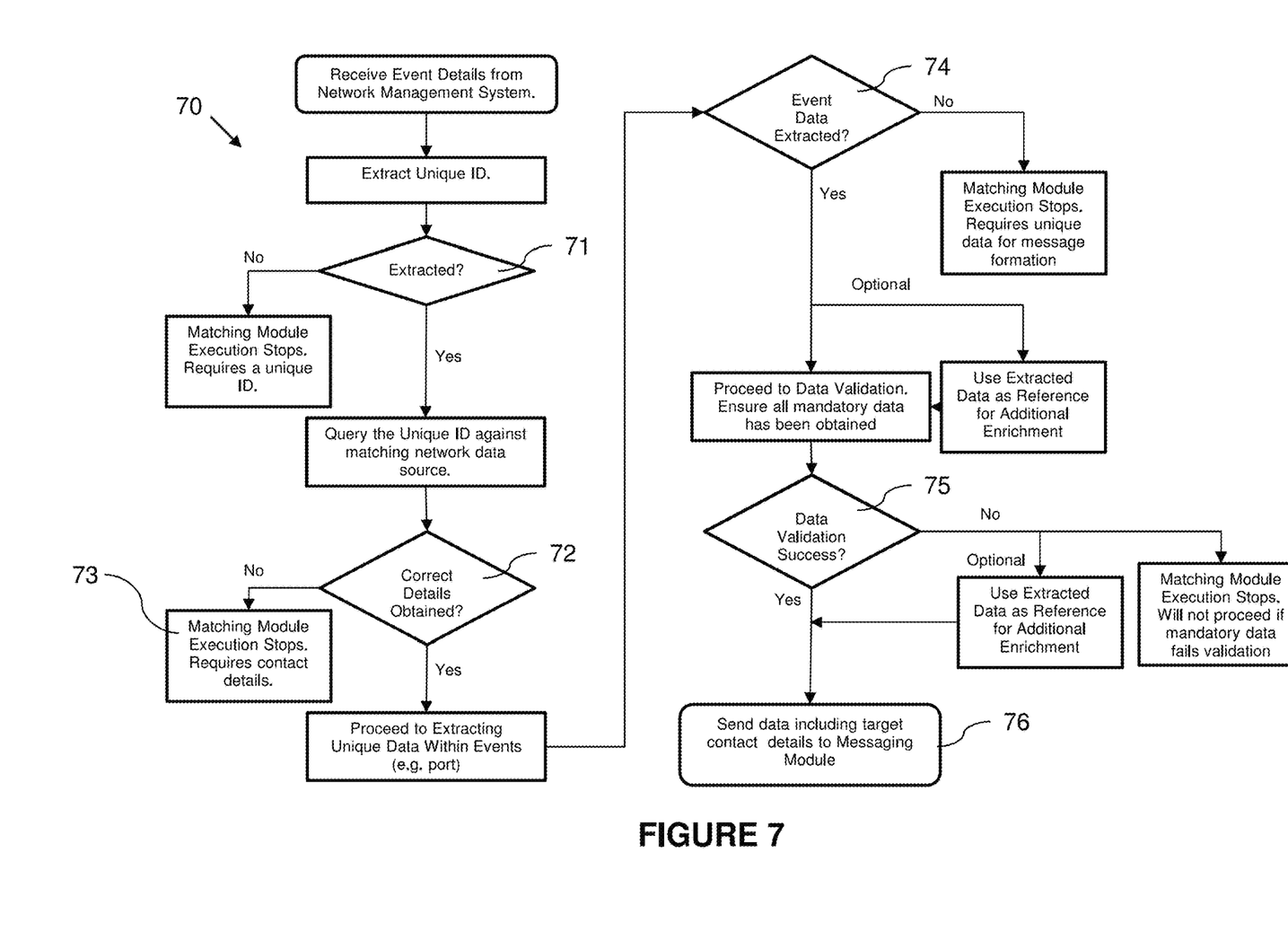
FIG. 7 is a flow diagram showing logic level steps performed by the system's matching module.

An example of the XML AMS 35 sends to listener is shown below. The underlined sections identify the data that the listener parses and formats into JSON (JavaScript Object Notation) before sending the data to the matching logic service 70.

```
<soapenv:Envelope
xmlns:soapenv="http://schemas.xmlsoap.org/soap/envelope/"
xmlns:xsd="http://www.w3.org/2001/XMLSchema"
xmlns:xsi="http://www.w3.org/2001/XMLSchema-instance">
    <soapenv:Header>
        <tmf854:header tmf854Version="1.0" xmlns:tmf854="tmf854.v1">
            <tmf854:activityName>notify</tmf854:activityName>
            <tmf854:msgName>notify</tmf854:msgName>
            <tmf854:msgType>NOTIFICATION</tmf854:msgType>
            <tmf854:senderURI>127.0.0.1</tmf854:senderURI>
<tmf854:destinationURI>apc/notificationGroup</tmf854:destinationURI>
<tmf854:communicationPattern>Notification</tmf854:communicationPattern>
            <tmf854:communicationStyle>MSG</tmf854:communicationStyle>
        </tmf854:header>
    </soapenv:Header>
    <soapenv:Body>
        <tmf854:notify tmf854Version="1.0" extAuthor="alu"
extVersion="1.0" xmlns:tmf854="tmf854.v1">
            <tmf854:topic>apc/notificationGroup</tmf854:topic>
            <tmf854:message>
                <tmf854:VendorNotification>
                    <tmf854:notificationId>3</tmf854:notificationId>
<tmf854:vendorNotificationType>ApcServiceProvisioningNotification</tmf854:vendorNotificationType>
                    <tmf854:vendorExtensions>
                        <alu:ApcServiceProvisioningNotification
```

-continued

```
xmlns:alu="alu.v1" >
                                <operationDate>2017/08/22</operationDate>
                                <operationTime>23:32:07</operationTime>
                                <operationMode>Automated</operationMode>
                                <operationKind>Service
Provisioning</operationKind>
                                <clientName>ontListenerClient</clientName>
                                <apcEvent>
                                        <eventObjectName>OLTNAME_001:1-1-4-1
</eventObjectName>
                                        <eventInformation>
                                                <argument>
                                                        <name>eventType</name>
                                                        <value>newONT</value>
                                                </argument>
                                                <argument>
                                                        <name>LOID</name>
                                                        <value></value>
                                                </argument>
                                                <argument>
                                                        <name>SERNUM</name>
                                                        <value>ALCLFAB0910B</value>
                                                </argument>
                                                <argument>
                                                        <name>DISIND</name>
                                                        <value></value>
                                                </argument>
                                                <argument>
                                                        <name>SLID</name>
<value>00000000000000000000</value>
                                                </argument>
                                        </eventInformation>
                                </apcEvent>
                        </alu:ApcServiceProvisioningNotification>
                </tmf854:vendorExtensions>
            </tmf854:VendorNotification>
        </tmf854:message>
    </tmf854:notify>
  </soapenv:Body>
</soapenv:Envelope>
```

After the listener parses the above XML and extracts the appropriate information, the below JSON message is constructed and sent to the matching logic service.

```
{
    "user" : "<confidential_username>",
    "password" : "<confidential_password>",
    "group" : "NBNCO",
    "requester": "ontListenerClient",
    "serialNumber" : "ALCLFAB0910B",
    "objectName" : "OLTNAME_001:1-1-4-1"
}
```

In the embodiments described, the matching module, consists of two separate components: the listener, as described above, and the matching logic service, described below with reference to FIG. 7. The matching logic service 70 is a web service coded in PHP programming language, leveraging Zend Framework 3 file structure methodology and modules. The code base is compiled and run by an apache webserver, all of which are mounted within a Docker container that resides on a Linux virtual machine.

The matching logic service is an application programmable interface (API) that the listener passes information onto via a JSON HTTP request. The matching logic service codebase consists of 4 logical steps 71, 72, 74, 75.

Logical step one 71 is the first set of code that is executed when the JSON object is received. In this step, the remote procedure call (RPC) controller will check whether the HTTP request is JSON. In this embodiment, it will also check whether the request is authorised and authenticated by ensuring username, password, group, requester are all present before finally ensuring that the serial number is present to be extracted. Note: the username, password, group and requestor fields are mandatory in the context of this embodiment for the purpose of authorising and authenticating incoming requests.

In this embodiment, the HTTP thread opened by the listener will be dropped by flushing a 200 HTTP status code after 71. This is for the purpose of avoiding a thread being held open for the entire matching logic flow. This decision was made to ensure the listener is capable of communicating multiple requests per second without threatening the scalability of the solution.

In logical step two 72 contact details of the user mapped to the serialNumber received in 71 are obtained by checking against the matching database. If the serialNumber passed in by the listener is not mapped to any user within the matching database, the matching logic execution stops 73 and a log is created in the database for auditing purposes. Eg. Message: "No user found on SMS system with the searched serial Number".

During the third logical step 74 the objectName provided in the HTTP JSON request is used to extract Line Terminal Card #, PON Port #, OLT # and Site Code. This step then maps these values to individual PHP variables. These variables are used further in the code to format the final SMS message.

During the fourth logical step four 75 a formatted message, example below, is prepared before being interrogated by a validating function that ensures the message contains all mandatory values in an expected format.

Physical Name:
OLTNAME_001
Line Terminal Card:
1
PON Port:
4
Serial number:
ALCLFAB0910B
Buz'd at:
13:37:38pm AWST 08/09/2018

Using the mobile number obtained from 71 and validated message format from 75, the matching logic service 37 sends a HTTP request to an SMS Gateway provider such as Telstra Integrated Messaging System (TIMS) API. The HTTP request is sent using their endpoint interface specification, target server url with appropriate credential and body parameters. If TIMS fails to respond back with acknowledgement of the message request, the matching logic service will log an exception within the database for auditing purposes. Otherwise, if TIMS responds back, two logs are entered into the database by the matching service, a PASS on matching service logic and a PASS on TIMS SMS message sent. The TIMS SMS log will also include a message ref ID that can be used to query TIMS for message status updates.

At this point, the human operator should have received the message. Records are stored in the database for auditing purposes and a system administration dashboard has been developed to present this information.

In the embodiment described, the matching logic service interacts with an Oracle database to store its relational data. Five database tables have been created to facilitate the end to end success of the automated solution. The tables that are required for the above code base to execute successfully include:

TABLE 1

T_SMS_API_LOG keeps track of all alarms coming through and their SMS success/failure.

| SMS_API_LOG_TYPE_ID | SMS_API_TYPE_ID | IPACT_USER_ID | SMS_API_LOG_TYPE_ID |
|---|---|---|---|
| * | * | * | * |
| 246 | 1 | 105 | 1 |
| 247 | 1 | 105 | 2 |
| * | * | * | * |

| SMS_API_REQUEST | SMS_API_RESPONSE | SMS_API_DATE | SMS_API_STATUS |
|---|---|---|---|
| * | * | * | * |
| <req string here> | <res string here> |  | 05/SEP/17 |
| <req string here> | <res string here> |  | 05/SEP/17 |
| * | * | * | * |

| MESSAGE_REF_ID | RECORD_CREATED_USERID | RECORD_CREATED_DATE |
|---|---|---|
| * | * | * |
| null | 105 | 05/SEP/17 |
| 1051650604 | 105 | 05/SEP/17 |
| * | * | * |

TABLE 2

T_SMS_API_USER_MAPPING allows users to register their serial number and map it to a matching user id. (In this embodiment, the system is named IPACT and contains a database table SYS_USER_TABLE that contains relational reference to a IPACT_USER_ID's mobile number).

| SMS_API_TYPE_ID | IPACT_USER_ID | SMS_REF_KEY | RECORD_CREATED_USERID | RECORD_CREATED_DATE |
|---|---|---|---|---|
| 1 | 7701 | ALCLF8A9F17D | 7701 | 31/AUG/17 |
| * | * | * | * | * |

TABLE 3

T_SMS_API_TYPE references the alarm type of SMS being sent. In this embodiment the alarm type for logging purposes is named ONT_ALARM and is assigned the id 1.

| SMS_API_LOG_TYPE_ID | SMS_API_LOG_TYPE_NAME | RECORD_CREATED_USERID | RECORD_CREATED_DATE |
|---|---|---|---|
| 1 | ONT_ALARM | 105 | 31/JUL/17 |

TABLE 4

T_SMS_API_LOG_TYPES references the http API types used throughout the process of sending an SMS. This table can be used as a reference to map ID's to log type names in the API LOG TABLE. Successful/unsuccessful matching logic will create a log tied to SMS_API_LOG_TYPE IPACT_API (1). Successful/unsuccessful message requests against the TIMS SMS gateway will create a log tied to SMS_API_LOG_TYPE TIMS_API (2).

| SMS_API_LOG_TYPE_ID | SMS_API_LOG_TYPE_NAME | RECORD_CREATED_USERID | RECORD_CREATED_DATE |
|---|---|---|---|
| 1 | IPACT_API | 105 | 31/JUL/17 |
| 2 | TIMS_API | 105 | 31/JUL/17 |

TABLE 5

SYS_USER_TABLE - contains mobile number of users registered to the system. This table is referenced by T_SMS_API_USER_MAPPING to obtain the details of a human operator based off their USER_ID primary key.

| IPACT_USER_ID | NAME | MOBILE_NUMBER | COMPANY |
|---|---|---|---|
| 7701 | John Smith | 0400111222 | Example Company |

It will be appreciated by persons skilled in the art that numerous variations and/or modifications may be made to the technology as shown in the specific embodiments without departing from the spirit or scope of technology as broadly described. The present embodiments are, therefore, to be considered in all respects as illustrative and not restrictive.

GLOSSARY

AMS Access Management System
ONT Optical Network Terminal
OLT Optical Line Terminal
GPON Gigabit Passive Optical Network
NTD Network Termination Device
VPN Virtual Private Network
PON Passive Optical Network
LFN Lit Fibre Network
HLD High Level Design
SMS Short Message Service
RFS Ready For Service
JSON JavaScript Object Notation
XML A metalanguage which allows users to define their own customized mark-up languages, especially in order to display documents on the Internet.
TIMS Telstra Integrated Messaging Service
iPact Integrated Platforms and Consolidated Tools
JMS Java Message Service
SFP Small Form-factor Pluggable
USB Universal Serial Bus
API Application Programming Interface
ISAM Intelligent Services Access Manager
FTTP Fibre to the Premise
FTTC Fibre to the Curb
FTTX Fibre to the X
LT Line Terminal
APC Access Provisioning Centre
HFC Hybrid Fibre Coaxial

The invention claimed is:

1. A method for identifying a telecommunication network data port, the method comprising:
using a network termination device (NTD) connected to an access node (AN) of a telecommunication network to send a signal comprising a NTD unique identifier through the telecommunication network;
using a network management system (NMS) to receive the signal and provide a data matching module with access to the signal;
the data matching module receives the signal and matches the unique identifier with a human network operator associated to the NTD; and
when a match is found, a messaging module sends a message to the human network operator, the message including identification information of the data port.

2. The method of claim 1, wherein the telecommunication network is an optical telecommunication network and the data port is an optical data port.

3. The method of claim 1, wherein the NTD is an optical network terminal (ONT).

4. The method of claim 1, wherein the access node is an optical line terminator (OLT).

5. The method of claim 1, wherein the unique identifier comprises a serial number of the NTD or a MAC address of the NTD.

6. The method of claim 1, wherein the step of sending a message to the human network operator comprises the step of sending an SMS or a notification to a mobile communication device of the human network operator.

7. The method of claim 1, wherein the identification information of the data port include one or a combination of: a physical location of the data port, a logical location of the data port, a location of the access node or a location of a related chassis card.

8. Currently Amended The method of claim 7, wherein the identification information of the data port comprise information related to a communication path between the NTD and the AN.

9. The method of claim 1, wherein the step of sending a signal comprising a unique identifier comprises sending a predetermined NTD event code through the telecommunication network.

10. The method of claim 1, wherein the event code is an alarm code provided in a library of alarm codes of the NTD or NMS.

11. The method of claim 1, wherein the method further comprises the step of receiving a predetermined NTD event code using a listener module configured to interpret the predetermined NTD or NMS event code as a request for identification of a data port.

12. The method of claim 1, wherein the step of matching the unique identifier with a human network operator associated to the NTD comprises the step of accessing a database comprising details of a plurality of registered human network operators and associations between each human network operator and a NTD.

13. A system for identifying a telecommunication network data port, the system comprising:
- a network termination device (NTD) arranged to connect to an access node (AN) of a telecommunication network and send a signal comprising a NTD unique identifier through the telecommunication network;
- a network management system (NMS) arranged to receive the signal and provide a network matching module with access to the signal;
- a network matching module arranged to receive the signal and match the unique identifier with a human network operator associated to the NTD; and
- a messaging module arranged to forward a message to the human network operator, the message including identification information of the data port;
- wherein, in use, the human network operator connects the NTD to the AN and automatically receives a message including the identification information NTD.

14. The system of claim 13, wherein the telecommunication network is an optical telecommunication network and the data port is an optical data port.

15. The system of claim 13, wherein the NTD is an optical network terminal (ONT).

16. The system of claim 13, wherein the access node is an optical line terminator (OLT).

17. The system of claim 13, wherein the unique identifier comprises a serial number of the NTD or a MAC address of the NTD.

18. The system of claim 13, wherein the identification information of the data port include one or a combination of: a physical location of the data port, a logical location of the data port, a location of the access node or a location of a related chassis card.

19. The system of claim 18, wherein the identification information of the data port comprise information related to a communication path between the NTD and the AN.

20. The system of claim 13, wherein the NTD is further arranged to send a signal comprising a predetermined NTD event code through the telecommunication network.

21. The system of claim 20, wherein the event code comprises an alarm code provided in a library of alarm codes of the NTD or NMS.

22. The system of claim 13, wherein the system further comprises an event listener module receiving event data from the NMS and configured to interpret a predetermined NTD event code as a request for identification of a data port.

23. The system of claim 13 wherein the system further comprises a database comprising details of a plurality of registered human network operators and associations between each human network operator and a NTD.

24. The system of claim 23, wherein the matching module is configured, upon detecting a predetermined event code through a listener module, to interrogate the database and match the NTD unique identifier with a human network operator identifier.

* * * * *

UNITED STATES PATENT AND TRADEMARK OFFICE
CERTIFICATE OF CORRECTION

PATENT NO. : 11,095,521 B2
APPLICATION NO. : 16/532231
DATED : August 17, 2021
INVENTOR(S) : Martin Kieliszek et al.

Page 1 of 1

It is certified that error appears in the above-identified patent and that said Letters Patent is hereby corrected as shown below:

In the Claims

In Claim 8, Column 14, Line 55 "Currently Amended" should be deleted before The method of Signed and Sealed this
Fifth Day of October, 2021

Drew Hirshfeld
*Performing the Functions and Duties of the
Under Secretary of Commerce for Intellectual Property and
Director of the United States Patent and Trademark Office*